Dec. 7, 1926.
C. S. ASH
1,609,282
METHOD OF ASSEMBLING WIRE WHEELS
Filed Feb. 25, 1924
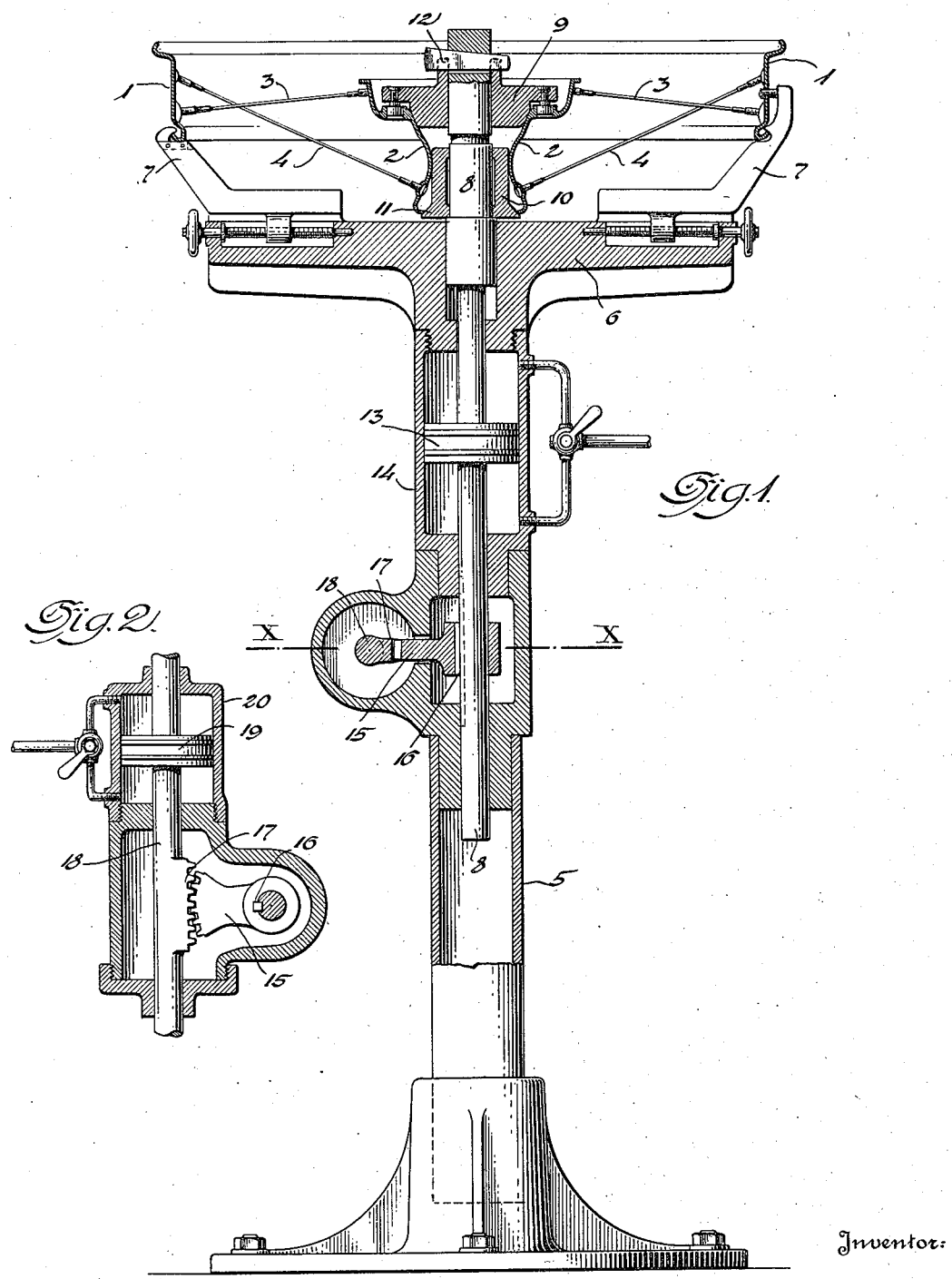
Inventor:
Charles S. Ash
By
Attorneys Patented Dec. 7, 1926.

1,609,282

UNITED STATES PATENT OFFICE.

CHARLES S. ASH, OF ROYAL OAK, MICHIGAN.

METHOD OF ASSEMBLING WIRE WHEELS.

Application filed February 25, 1924. Serial No. 694,827.

This invention relates to a method of assembling wire wheels whereby the operations of testing and truing the wheel and tightening and seating the wire spokes is facilitated and perfected.

The problem in wire wheel assembly, is the production of a substantial wheel, and with the present methods it is almost impossible to determine, by inspection of the finished wheel, whether or not said wheel is properly assembled and is substantial and capable of fulfilling the purposes for which it was designed. Due to variations in machine work, punching and drilling operations, etc, it has been found that the several parts will not assemble properly, the greatest defects consisting, usually, in the improper seating of the spoke nipples and heads within their seats in the rim and hub shell, such seating in the assembly as commonly practiced being, in many instances, a point bearing which cannot be readily detected, but which causes a rapid loosening of certain spokes as they wear to their seats in use, thus putting a severe strain on others and causing breakage and weakness in the structure. Further, while the wheel may be true when inspected, the loosening of certain spokes throws it more or less out of alignment and the life of the wheel is thereby shortened.

A desideratum in wire wheel assembly and the object of the present invention, is to so assemble the wire spokes in the wheel as to facilitate and insure accurate and proper tightening of the spokes and the perfect seating of each spoke, whereby all will be under a proper and equal strain and this condition will be maintained in use; and further, to so accurately locate the hub relative to the rim that the necessity for final truing of the wheel will be practically obviated, thus greatly facilitating manufacture and insuring the production of a wheel which will withstand the strains for which it was designed and remain true in use.

With the above and other ends in view the invention consists in first connecting the hub and rim by spokes, then locating and securing the hub and rim in their proper relative positions, and thereafter moving the hub relative to the rim, whereby the spokes are put under strain to facilitate the accurate tightening of the spokes and to cause the same to properly seat. The invention further consists in certain other new and useful features in the method, and in the manner of performing the same, all as hereinafter more fully set forth.

Referring to the accompanying drawing illustrative of one form of suitable means which may be employed in practicing the method embodying the invention;

Figure 1 is a longitudinal vertical section of a wheel stand for locating and holding a wheel rim and hub in proper relative position and for manipulating the wheel to put a strain upon the alternate rows of spokes and to cause the spoke nipples and heads to properly seat, it being understood that the several steps of the process of assembly may be performed by any other suitable means or by hand, and Fig. 2 is a transverse section substantially upon the line X—X of Fig. 1.

In order to properly locate the wheel rim 1 relative to its hub 2 and to rigidly hold the same after the two rows 3 and 4 of spokes have been inserted and their nipples turned up to loosely hold the spokes in place, a suitable stand or holder may be employed comprising a pedestal 5 for supporting a head 6 adapted to hold the wheel rim concentric with its hub shell 2, which hub shell is mounted upon the upper end of a shaft 8 with filler blocks 9 and 10 inserted in its upper and lower ends respectively, said blocks being rigidly and detachably secured to the shaft in any suitable manner as by a shoulder 11 on the shaft to engage the lower end of the block 10 and a wedge pin 12 to engage the upper end of the block 9. The shaft 8 is mounted in the pedestal and head to have a longitudinal movement therein and may also be arranged to permit of a rotary motion, and any suitable means may be provided for moving the shaft longitudinally, such as a piston 13 on the shaft within an air cylinder 14 through which the shaft extends, the cylinder forming a part of the pedestal. Separate means may also be provided for imparting a rotary motion to the shaft, such as an arm 15 secured to the shaft by a spline 16 to turn the shaft and permit of an endwise movement of the shaft relative to the arm. This arm 15 may be swung to turn the shaft by giving its outer end the form of a gear segment to engage rack teeth 17 on a piston rod 18 which is provided with a piston 19 within an air cylinder 20. Any other suitable means may however be employed for moving the shaft positively in both directions or for rotating the same, the construction shown being merely illustrative of one form of mechanical means for the purpose, and certain steps of the method or process embodying the present invention may thus be mechanically performed to facilitate its practice, although the several steps may be separately and manually performed.

It is the usual practice in assembling wire wheels to first locate the hub and rim relatively and then thread the spokes through the openings provided in the hub shell and connect them to the rim by tightening the spoke nipples. These nipples are tightened usually by means of a power screw driver so that approximately the same tightening force will be applied to each spoke. The wheel is then inspected and the spokes examined to ascertain whether or not they are under equal strain, and then the wheel is given a final truing.

As it is impossible to ascertain through inspection whether or not all of the spoke heads and nipples are properly seated, it is of common occurence, that after a comparatively short period of use, it is found that some of the spokes are loose, and as undue strain is thus put upon others, breakage often occurs. This loosening of certain spokes is due to the fact that the spoke heads or nipples were not properly seated in their seats in the hub or rim when assembled, and after a short period of use, wear to their seats, and thus become loose.

Inaccuracies in machining and assembly are the causes of this imperfect seating and proper tightening of the spokes, and these defects are not apparent until the wheel has been placed in service which causes the heads and nipples to wear to their seats under the strains to which the wheel is subjected.

The present method of assembly includes the placing of the spokes under abnormal strain so that they may be properly tightened and may also include the subjecting of these spokes to strains similar to those to which they are subjected when the wheel is put into actual use, thus insuring a perfect seating of the heads and nipples of all of the spokes during the assembly operation, so that all may be put under an equal tension, which tension will be maintained in use, thus insuring long life and minimizing breakage.

In practicing the present method of assembly, the rim and hub are first loosely connected by the spokes by threading the spokes through their openings in the hub shell and securing their outer ends in the openings in the rim by turning of the nipples thereon in the usual manner and then the rim and hub are properly located in their relative positions, the rim being securely clamped and held in perfectly circular formation, and the hub firmly and rigidly held concentric with the rim and properly located laterally of the plane of the rim. The hub and rim are then moved relatively, as by moving the hub transversely of the plane of the rim or by alternately rotating the hub in first one direction and then the other, to strain first one and then the other of the rows 3 and 4 of spokes, thus subjecting all of the spokes to strains similar to those to which they are subjected in use and causing all of the heads and nipples of the spokes to seat perfectly. To insure a perfect even tightening of all of the spokes and to assist in such tightening operation, one row of spokes is put under an abnormal strain by a relative movement between hub and rim, the row of spokes thus loosened is then tightened by turning up the spoke nipples, and then this row, the nipples of which have just been tightened, is subjected to an abnormal strain by an opposite relative movement of hub and rim and the nipples on the row which was first put under tension, are turned up. An even tension on all of the spokes is thus insured and a tension which is sufficient to hold the rim against springing out of round when released from its clamping means. The operation of truing the wheel after assembly may therefore be dispensed with or at most it will be a mere perfunctory operation.

By insuring the perfect seating of the heads and nipples of all of the spokes in their seats, loosening of any of the spokes in use is obviated and even tension on all of the spokes is insured, thus eliminating breakage due to such uneven tension; and by insuring proper, even tensioning of the spokes at the time of assembly and while the hub and rim are held in perfect concentric relation, a true running wheel is secured and one which will remain true in use.

As illustrative of one means which may be employed as an aid in performing certain steps in the present method of assembly, the above described device is shown in the accompanying drawing, and which device is designed to operate as follows:

A wheel and hub with spokes loosely connecting the same is placed on the stand with the wheel rim placed between the several jaws 7 of the chuck and these jaws moved evenly inward to firmly clamp the rim, bringing said rim to a perfect circle should it be slightly deformed or out of round, and the hub shell is accurately centered and locked in place upon the upper end of the shaft 8, concentric with the rim and correctly positioned laterally of the rim, the shaft being moved longitudinally to so position the hub laterally within the rim and then firmly held in that position while the spokes are given a preliminary tightening by turning up the nipples.

The hub is next moved relative to the rim, alternately in opposite directions, as by admitting fluid under pressure to first one end and then to the other of the cylinder 14 which will cause a reciprocation of the piston therein and of the shaft 8, thereby moving the hub first laterally of the rim in one direction and then in the opposite direction to alternately put a strain upon the two rows of spokes 3 and 4; or compressed fluid may be admitted to the cylinder 20 in a like manner to alternately rotate the shaft in opposite directions and thus alternately put a strain upon the oppositely directed tangential rows of spokes when the wheel embodies the tangential arrangement of two or more rows, as is the common practice in wire wheel constructions. The spokes are thus alternately subjected to strains similar to those to which they are subjected when the wheel is in actual use and the heads and nipples of the several spokes are brought thereby to a perfect seating in their seats in the hub and rim, that is the wheel is "run in" so that all of the heads and nipples will be perfectly seated.

After the wheel is thus "run in" to insure the perfect seating of the spoke ends, they are finally tightened or put under the proper strain, by turning up the nipples thereon. To insure perfect seating and assist in the tightening operation as well as to insure the proper amount of and even strain upon all of the spokes, the hub may be moved in the same manner relative to the rim in one direction and held while the row of spokes which is loosened by such movement is being tightened, and then moved in an opposite direction to put an undue strain on the tightened row and held under such strain while the row which was first put under strain, is tightened. The proper and accurate amount of tension upon each spoke is thus insured without danger of injury to any of the nipples in turning them up and the tightening operation is facilitated.

As the rim is firmly held all during the assembling of the wheel, in accurate concentric relation to the hub and in exact circular form, when the spokes are given the final tightening and the wheel is released from the stand, the rim remains true and concentric with its hub, being rigidly held by the tensioned spokes, and therefore the necessity for a final truing operation is obviated, and the wheel will remain in this condition under the strains to which it is subjected in use due to the fact that all spokes are perfectly seated and under like tension Obviously the hub and rim may be moved relatively any number of times to suit the conditions, and while the stand as shown is designed to hold the rim and move the hub. it is obvious that the hub may be held and the rim moved or both may be moved to tension the spokes. The present method may be further modified within the scope of the claims without departing from the spirit of the invention and I do not, therefore, limit myself to the process or method as more particularly described.

Having thus fully described my invention, what I claim is:—

1. In the assembly of wire wheels, the method of seating the heads of wire spokes in their seats on hub and rim which consists in holding the hub and rim in concentric relation, with the heads of wire spokes seated upon, and the spokes connecting, the hub and rim and then vibrating the rim and hub relatively to wear the heads to their seats prior to final tightening of the spokes.

2. In the assembly of wire wheels, the method of seating spokes in their seats which consists in clamping and rigidly holding a rim, holding a hub concentric with said rim with spokes threaded through openings in the hub and secured to the rim under tension, and then vibrating the hub relative to the rim to wear the spoke heads to their seats.

3. In the assembly of wheels having a hub and rim with tangential wire spokes connecting the hub and rim, the spokes being arranged in rows with certain spokes extending in a tangential direction opposite to that of others; the method of tensioning the spokes which consists in locating and holding the hub concentric with the rim and then moving the hub and rim relatively and rotatively upon the wheel axis to first tension the spokes extending tangentially in one direction and then tension those extending tangentially in an opposite direction, the strain put upon said spokes by such relative rotation of hub and rim being in the direction of the torque on the wheel in use.

4. The method of assembling wheels having a hub formed with openings to receive the inner ends of wire spokes and a rim formed with openings and seats to receive the outer ends and heads of the spokes, said spokes being arranged in rows with one row extending tangentially in a direction opposite to that of another row, which method consists in securely clamping the rim and holding the same in circular condition, holding the hub concentric with the rim, placing the spokes under tension between the hub and rim, moving the hub relatively with a rotative vibratory motion to bring the spoke heads to their seats, rotating the hub in one direction to tension one row of spokes and tightening the other row while the tensioned row is held under tension, then rotating the hub in an opposite direction to further tension the tightened row and holding the same under tension and tightening the row first put under tension.

5. The method of assembling wheels having a hub and a rim with wire spokes connecting the hub and rim and provided with heads and nipples to engage seats in the hub and rim, which method consists in clamping and holding a rim, holding a hub concentric with the rim with wire spokes secured to the hub and rim by the heads and nipples on the spokes engaging the seats in the hub and rim, then moving the hub and rim relatively with a vibratory motion to wear the heads and nipples to their seats, and then tightening the spokes to bring the heads and nipples to their seats.

In testimony whereof I affix my signature.

CHARLES S. ASH.